United States Patent
Luo et al.

(10) Patent No.: US 12,134,295 B2
(45) Date of Patent: Nov. 5, 2024

(54) ANTI-DIVE CONTROL METHOD FOR AUTOMOBILE, AND RELATED DEVICE

(71) Applicant: GUANGZHOU AUTOMOBILE GROUP CO., LTD., Guangzhou (CN)

(72) Inventors: Jie Luo, Guangzhou (CN); Jun Yin, Guangzhou (CN); Haoju Hu, Guangzhou (CN); Qinglin Chen, Guangzhou (CN)

(73) Assignee: GUANGZHOU AUTOMOBILE GROUP CO., LTD., Guangzhou (CN)

( * ) Notice: Subject to any disclaimer, the term of this patent is extended or adjusted under 35 U.S.C. 154(b) by 219 days.

(21) Appl. No.: 17/758,435

(22) PCT Filed: Jun. 1, 2021

(86) PCT No.: PCT/CN2021/097623
§ 371 (c)(1),
(2) Date: Jul. 6, 2022

(87) PCT Pub. No.: WO2021/244513
PCT Pub. Date: Dec. 9, 2021

(65) Prior Publication Data
US 2023/0021844 A1      Jan. 26, 2023

(30) Foreign Application Priority Data

Jun. 4, 2020 (CN) .......................... 202010500269.1

(51) Int. Cl.
*B60G 17/016* (2006.01)
*B60G 17/018* (2006.01)
*B60G 17/0195* (2006.01)

(52) U.S. Cl.
CPC ......... *B60G 17/016* (2013.01); *B60G 17/018* (2013.01); *B60G 17/0195* (2013.01); *B60G 2500/10* (2013.01)

(58) Field of Classification Search
CPC ................ B60G 17/016; B60G 17/018; B60G 17/0195; B60G 17/0164; B60G 17/015;
(Continued)

(56) References Cited

U.S. PATENT DOCUMENTS 11,110,913 B2 * 9/2021 Krosschell ......... B60G 17/0162
11,878,678 B2 * 1/2024 Krosschell ....... B60G 17/01908
(Continued)

FOREIGN PATENT DOCUMENTS

| CN | 101844498 A | 9/2010 |
|---|---|---|
| CN | 104080671 A | 10/2014 |

(Continued)

OTHER PUBLICATIONS

Office Action mailed to Chinese Corresponding Patent Application No. 202010500269.1 on Feb. 20, 2024.
(Continued)

*Primary Examiner* — Hai H Huynh
(74) *Attorney, Agent, or Firm* — Hodgson Russ LLP (57) ABSTRACT

The anti-dive control method for the automobile comprises: obtaining preset automobile operating condition parameters, and obtaining parameter values of the automobile operating condition parameters in real time; determining in real time whether the parameter values of the automobile operating condition parameters satisfy a preset first trigger condition or a preset second trigger condition; if the parameter values of the automobile operating condition parameters satisfy the preset first trigger condition, obtaining a preset first control strategy corresponding to the first trigger condition; implementing real-time control of the suspension damping force of the automobile according to the first control strategy; if the parameter values of the automobile operating condition parameters satisfy the preset second trigger condition, obtaining a preset second control strategy corresponding to
(Continued)

the second trigger condition; and implementing real-time control of the suspension damping force of the automobile according to the second control strategy.

17 Claims, 4 Drawing Sheets

(58) Field of Classification Search
CPC ............ B60G 17/0182; B60G 2500/10; B60G 2400/106; B60G 2400/50; B60G 2400/90; B60G 2800/014
USPC ...................... 701/37, 38, 39, 40, 78, 79, 83
See application file for complete search history.

(56) References Cited

U.S. PATENT DOCUMENTS

| | | | |
|---|---|---|---|
| 11,912,096 B2 * | 2/2024 | Graus | B60G 17/01933 |
| 2002/0045977 A1 | 4/2002 | Uchiyama et al. | |
| 2011/0187065 A1 | 8/2011 | Van Der Knaap et al. | |
| 2015/0066295 A1 | 3/2015 | Kanda | |
| 2018/0141543 A1 * | 5/2018 | Krosschell | B60G 17/01908 |

FOREIGN PATENT DOCUMENTS

| | | |
|---|---|---|
| CN | 104553666 A | 4/2015 |
| CN | 105109299 A | 12/2015 |
| CN | 106739918 A | 5/2017 |
| CN | 107031330 A | 8/2017 |
| CN | 108081894 A | 5/2018 |
| CN | 108099535 A | 6/2018 |
| CN | 110121438 A | 8/2019 |
| CN | 110329030 A | 10/2019 |
| CN | 110641430 A | 1/2020 |
| CN | 112124027 A | 12/2020 |
| CN | 116476588 A | 7/2023 |
| EP | 0426340 A1 | 5/1991 |
| EP | 2487057 A1 | 8/2012 |
| JP | H01109112 A | 4/1989 |
| JP | H06270628 A | 9/1994 |
| JP | 2008082382 A | 4/2008 |
| JP | 20080189025 A | 8/2008 |
| WO | 2015098217 A1 | 7/2015 |

OTHER PUBLICATIONS

Machine Translation of Office Action mailed to Chinese Corresponding Patent Application No. 202010500269.1 on Feb. 2024.
First Office Action mailed to Chinese Corresponding Patent Application No. 202010500269.1 on Nov. 9, 2023.

* cited by examiner

ANTI-DIVE CONTROL METHOD FOR AUTOMOBILE, AND RELATED DEVICE

CROSS-REFERENCE TO RELATED APPLICATIONS

This application is a 371 of International Application No PCT/CN2021/097623, filed Jun. 1, 2021, which is based upon and claims priority to Chinese Patent Application No. 202010500269.1, titled "ANTI-DIVE CONTROL METHOD AND APPARATUS FOR AUTOMOBILE, AND RELATED DEVICE", which was filed at the State Intellectual Property Office of the People's Republic of China on Jun. 4, 2020, the entire contents of which are referred and incorporated herein.

TECHNICAL FIELD

The present application relates to the technical field of automobiles, and more particularly, to an anti-dive control method for an automobile, a device, an electronic suspension controller and a storage medium.

BACKGROUND

Anti-dive is one of the main functions of semi-active suspension automobiles with continuously adjustable damping force, which aims to adjust the suspension damping force on demand and in real time when some automobiles are diving, thereby reducing a dive angle of the automobile and improving the comfort and safety of the automobile.

At present, the anti-dive control method for the semi-active suspension automobiles with continuously adjustable damping force is generally as follows: a pressure signal of an brake master cylinder of the automobile or a longitudinal acceleration signal are obtained through a Controller Area Network (CAN) bus, and a target damping force control amount is obtained by checking the table according to the signal value.

At present, the anti-dive control methods for the automobile generally includes the following two control methods.

(1) A control method that only refers to the pressure signal of the automobile brake master cylinder.

The pressure signal of the automobile brake master cylinder is obtained through an automobile CAN bus, the target damping force control amount is obtained by checking the table according to the pressure signal of the brake master cylinder of the automobile, and an actuator is controlled to realize a real-time damping force control.

(2) A control method that only refers to the longitudinal acceleration signal.

The longitudinal acceleration signal of the automobile is obtained through the automobile CAN bus, the target damping force control amount is obtained by checking the table according to the longitudinal acceleration signal value, and the actuator is controlled to realize the real-time damping force control.

A disadvantage of the control method that only refers to the pressure signal of the brake master cylinder is that few automobile dive conditions are covered, which leads to a failure to control in time when other automobile dive conditions appear, and ultimately leads to a poor anti-dive effect of the automobile. A disadvantage of the control method that only refers to the longitudinal acceleration signal is that it cannot cover the dive conditions including an automobile dive condition caused by the intervention of a mechanical handbrake or an electronic handbrake, an untimely control caused by a slow response for the longitudinal acceleration signal, a misjudgment that may be caused when the automobile goes up and down a slope, and a misjudgment that may be caused when the automobile hits a step or other obstacles that may easily cause an oscillation of the longitudinal acceleration signal of the automobile, which will also lead to the poor anti-dive effect of the automobile.

SUMMARY

There are provided an anti-dive control method for an automobile, a device, an electronic suspension controller and a storage medium.

According to a first aspect of embodiments of the present disclosure, there is provided an anti-dive control method for an automobile, comprising:

obtaining a parameter value of a preset automobile operating condition parameter in real time;

determining in real time whether the parameter value of the automobile operating condition parameter satisfies a preset first trigger condition or a preset second trigger condition;

obtaining a preset first control strategy corresponding to the first trigger condition, if the parameter value of the automobile operating condition parameter satisfies the preset first trigger condition;

controlling a suspension damping force of the automobile in real time according to the first control strategy;

obtaining a preset second control strategy corresponding to the second trigger condition, if the parameter value of the automobile operating condition parameter satisfies the preset second trigger condition; and controlling the suspension damping force of the automobile in real time according to the second control strategy.

According to a second aspect of embodiments of the present disclosure, there is provided an anti-dive control device for an automobile, comprising:

a parameter value obtaining module, configured to obtain a parameter value of a preset automobile operating condition parameter in real time;

a determining module, configured to determine in real time whether the parameter value of the automobile operating condition parameter satisfies a preset first trigger condition or a preset second trigger condition;

a first strategy obtaining module, configured to obtain a preset first control strategy corresponding to the first trigger condition, if the parameter value of the automobile operating condition parameter satisfies the preset first trigger condition;

a first control module, configured to control a suspension damping force of the automobile in real time according to the first control strategy;

a second strategy obtaining module, configured to obtain a preset second control strategy corresponding to the second trigger condition, if the parameter value of the automobile operating condition parameter satisfies the preset second trigger condition; and a second control module, configured to control the suspension damping force of the automobile in real time according to the second control strategy.

According to a third aspect of embodiments of the present disclosure, there is provided an electronic suspension controller, comprising:
- a memory;
- a processor; and
- computer-readable instructions stored in the memory and executable by the processor;
- when the processor executes the computer-readable instructions, the following steps are performed:
- obtaining a parameter value of a preset automobile operating condition parameter in real time;
- determining in real time whether the parameter value of the automobile operating condition parameter satisfies a preset first trigger condition or a preset second trigger condition;
- obtaining a preset first control strategy corresponding to the first trigger condition, if the parameter value of the automobile operating condition parameter satisfies the preset first trigger condition;
- controlling a suspension damping force of the automobile in real time according to the first control strategy;
- obtaining a preset second control strategy corresponding to the second trigger condition, if the parameter value of the automobile operating condition parameter satisfies the preset second trigger condition; and
- controlling the suspension damping force of the automobile in real time according to the second control strategy.

According to a fourth aspect of embodiments of the present disclosure, there is provided a non-volatile readable storage medium having stored therein computer-readable instructions, wherein when the computer-readable instructions are executed by one or more processors, following steps are performed by the one or more processors:
- obtaining a parameter value of a preset automobile operating condition parameter in real time;
- determining in real time whether the parameter value of the automobile operating condition parameter satisfies a preset first trigger condition or a preset second trigger condition;
- obtaining a preset first control strategy corresponding to the first trigger condition, if the parameter value of the automobile operating condition parameter satisfies the preset first trigger condition;
- controlling a suspension damping force of the automobile in real time according to the first control strategy;
- obtaining a preset second control strategy corresponding to the second trigger condition, if the parameter value of the automobile operating condition parameter satisfies the preset second trigger condition; and
- controlling the suspension damping force of the automobile in real time according to the second control strategy.

The details of one or more embodiments of the application are set forth in the accompanying drawings and the description below, and other features and advantages of the application will become apparent from the description, drawings, and claims.

BRIEF DESCRIPTION OF THE DRAWINGS

In order to illustrate technical solutions of embodiments of the present invention more clearly, the drawings that are used in the description of the embodiments of the present invention will be introduced briefly as follows. Obviously, the drawings in the following description are only some embodiments of the present application, for those of ordinary skill in the art, other drawings may also be obtained from these drawings without creative labor.

DETAILED DESCRIPTION

The technical solutions in the embodiments of the present invention will be clearly and completely described below with reference to the accompanying drawings in the embodiments of the present invention. Obviously, the described embodiments are part of the embodiments of the present invention, but not all of the embodiments. Based on the embodiments of the present invention, all other embodiments obtained by those of ordinary skill in the art without creative efforts shall fall within the protection scope of the present invention.

Figure 1:
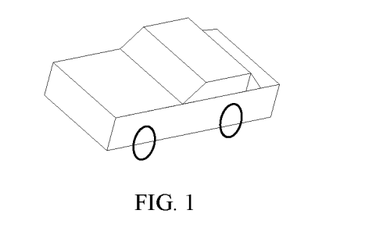
FIG. 1 illustrates a diagram of an application environment of an anti-dive control method for an automobile according to an embodiment of the present invention.

An anti-dive control method for an automobile provided by the present application may be applied in an automobile environment as shown in FIG. 1. The automobile is provided with an electronic suspension controller, which refers to an electronic control unit for controlling a suspension state in automobile engineering, and is one of the important components of the automobile.

Figure 2:
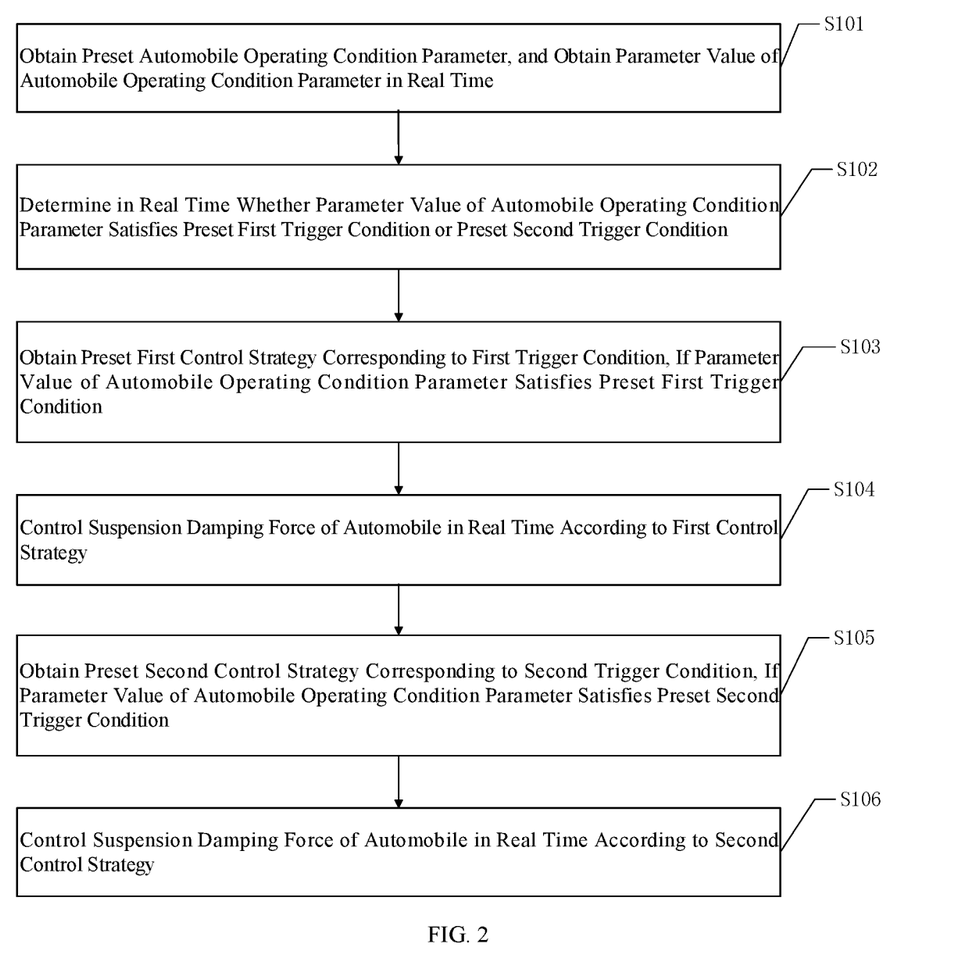
FIG. 2 is a flowchart of the anti-dive control method for the automobile according to an embodiment of the present invention.

In one embodiment, as shown in FIG. 2, provided is an anti-dive control method for an automobile, which is applied to an electronic suspension controller in the automobile in FIG. 1 as an example for description, and includes the following steps S101 to S106.

S101: a preset automobile operating condition parameter is obtained, and a parameter value of the automobile operating condition parameter is obtained in real time.

In one embodiment, the preset automobile operating condition parameter include but not limited to a wheel torque direction, a longitudinal acceleration, a wheel rotation direction, a wheel torque value and a pressure value of a brake master cylinder.

In this embodiment, the wheel torque direction is divided into a forward direction of the automobile and a backward direction of the automobile. The forward direction of the automobile is defined as a direction in which a wheel torque causes the automobile to accelerate in the forward direction of the automobile, and the backward direction of the automobile is defined as a direction in which the wheel torque causes the automobile to accelerate in the backward direction of the automobile.

The wheel rotation direction is divided into the forward direction of the automobile and the backward direction of the automobile. The forward direction of the automobile is defined as the direction in which a wheel rotation causes the automobile to accelerate in the forward direction of the automobile, and the backward direction of the automobile is defined as the direction in which the wheel rotation causes the automobile to accelerate in the backward direction of the automobile.

The longitudinal acceleration is positive in the forward direction of the automobile, and is negative in the backward direction of the automobile, which should be smaller than a longitudinal acceleration value caused by the automobile going up and down a slope in daily driving and a longitudinal acceleration value caused by passing through large obstacles such as steps.

S102: whether the parameter value of the automobile operating condition parameter satisfies a preset first trigger condition or a preset second trigger condition is determined.

In one embodiment, the step of determining in real time whether the parameter value of the automobile operating condition parameter satisfies the preset first trigger condition includes the following steps.

Whether the wheel torque direction is in the backward direction of the automobile is determined. If not, whether the longitudinal acceleration is smaller than the preset first threshold is determined. If yes, it is determined that the parameter value of the automobile operating condition parameter satisfies the preset first trigger condition.

In one embodiment, the step of determining in real time whether the parameter value of the automobile operating condition parameter satisfies the preset second trigger condition includes the following steps.

Whether the wheel torque direction is in the backward direction of the automobile is determine. If yes, whether the wheel rotation direction is in the backward direction of the automobile is determined.

If the wheel rotation direction is in the backward direction of the automobile, whether the wheel torque value is greater than the preset second threshold value is determined. If yes, it is determined that the parameter value of the automobile operating condition parameter satisfies the preset second trigger condition value.

If the wheel rotation direction is not in the backward direction of the automobile, whether the pressure value of the brake master cylinder is greater than a preset third threshold value is determined. If yes, it is determined that the parameter value of the automobile operating condition parameter satisfies the preset second trigger condition. Otherwise, whether the wheel torque value is greater than a preset fourth threshold. If yes, it is determined that the parameter value of the automobile operating condition parameter satisfies the preset second trigger condition. Otherwise, whether the longitudinal acceleration is smaller than a preset first threshold is determined. If yes, it is determined that the parameter value of the automobile operating condition parameter satisfies the preset second trigger condition.

S103: if the parameter value of the automobile operating condition parameter satisfies the preset first trigger condition, a preset first control strategy corresponding to the first trigger condition is obtained.

The parameter value of the automobile operating condition parameter includes both a value of the automobile operating condition parameter and an orientation of the automobile operating condition parameter. For example, the parameter value of the automobile operating condition parameter includes but is not limited to the wheel torque direction, the wheel rotation direction, the wheel torque value, the pressure value of the brake master cylinder, and the longitudinal acceleration.

S104: a suspension damping force of the automobile is controlled in real time according to the first control strategy.

In one embodiment, the step of controlling the damping force of the automobile in real time according to the first control strategy in step S104 further includes the following steps.

A preset first set of operating condition parameters corresponding to the first trigger condition are obtained, and each parameter value of the first set of operating condition parameters is obtained in real time.

The damping forces mapped to the each parameter value of the first set of operating condition parameters are queried, and the largest damping force obtained from the queried damping force is taken as the first damping force. A relationship between the pressure value of the brake master cylinder and the damping force and a relationship between the longitudinal acceleration and the damping force are determined by a practical automobile calibration. They are not necessarily expressed as a two-dimensional table, and may also expressed as a multi-dimension table including other input variables, such as automobile speed.

Each emergency deceleration condition triggered by the emergency deceleration trigger signal is obtained. The emergency deceleration trigger signals include a plurality of flags, and the operating conditions corresponding to these flags include but are not limited to: a mechanical handbrake braking, an electronic handbrake braking, and a braking caused by an actuation of other components with pressure establishment capability in the braking system during driving. When the above-mentioned conditions occur, a corresponding flag bit is set from 0 to 1, and any flag bit set from 0 to 1 will trigger a table querying and output a damping force. When multiple flag bits are set to 1 at the same time, the queried value from the table is compared and the maximum damping force is outputted.

The damping forces mapped to each triggered emergency deceleration operating condition are queried, and the largest damping force from the queried damping forces is taken as the second damping force.

A larger one of the first damping force and the second damping force is taken as a target damping force control amount, and the suspension damping force of the automobile is controlled in real time according to the target damping force control amount.

Further, the step of obtaining the preset first set of operating condition parameter corresponding to the first trigger condition, and obtaining the each parameter value of the first set of operating condition parameters in real time includes the following step.

The pressure value of the brake master cylinder and the longitudinal acceleration of the automobile are obtained in real time.

The step of querying the damping forces mapped to the each parameter value of the first set of operating condition parameters includes the following steps.

A damping force mapped to the pressure value of the brake master cylinder is queried.

A damping force mapped to the longitudinal acceleration of the automobile is queried.

In another embodiment, the step of controlling the suspension damping force of the automobile in real time according to the first control strategy in step S104 further includes the following steps.

A preset second set of operating condition parameters corresponding to the second trigger condition are obtained, and each parameter value of the second set of operating condition parameters is obtained in real time.

The damping forces mapped to the each parameter value of the second set of operating condition parameters are queried, and the largest damping force from the queried damping forces is taken as a third damping force.

Each emergency deceleration condition triggered by the emergency deceleration trigger signal is obtained.

The damping forces mapped to each triggered emergency deceleration operating condition are queried, and the largest damping force from the queried damping force is taken as the second damping force.

A larger one of the third damping force and the second damping force is taken as a target damping force control amount, and the suspension damping force of the automobile is controlled in real time according to the target damping force control amount.

Further, the step of obtaining the preset second set of operating condition parameters corresponding to the second trigger condition, and obtaining the each parameter value of the second set of operating condition parameters in real time includes the following step.

The pressure value of the brake master cylinder, the wheel torque value and the longitudinal acceleration of the automobile are obtained in real time.

The step of querying the damping forces mapped to the each parameter value of the second set of operating condition parameters includes the following steps.

A damping force mapped to the pressure value of the brake master cylinder is queried.

A damping force mapped to the wheel torque value is queried.

A damping force mapped to the longitudinal acceleration of the automobile is queried.

S105: if the parameter value of the automobile operating condition parameter satisfies a preset second trigger condition, a preset second control strategy corresponding to the second trigger condition is obtained.

The parameter value of the automobile operating condition parameter includes both the value of the automobile operating condition parameter and the orientation of the automobile operating condition parameter. For example, the parameter value of the automobile operating condition parameter includes but not limited to the wheel torque direction, the wheel rotation direction, the wheel torque value, the pressure value of the brake master cylinder and the longitudinal acceleration.

S106: the suspension damping force of the automobile is controlled in real time according to the second control strategy.

Since the automobile operating condition parameter changes with the different automobile conditions, the parameter value of the automobile operating conditions parameter is also changed in real time. In the control process of the anti-dive control method for the automobile, there is a possibility to jump from the first control strategy to the second control strategy.

Figure 3:
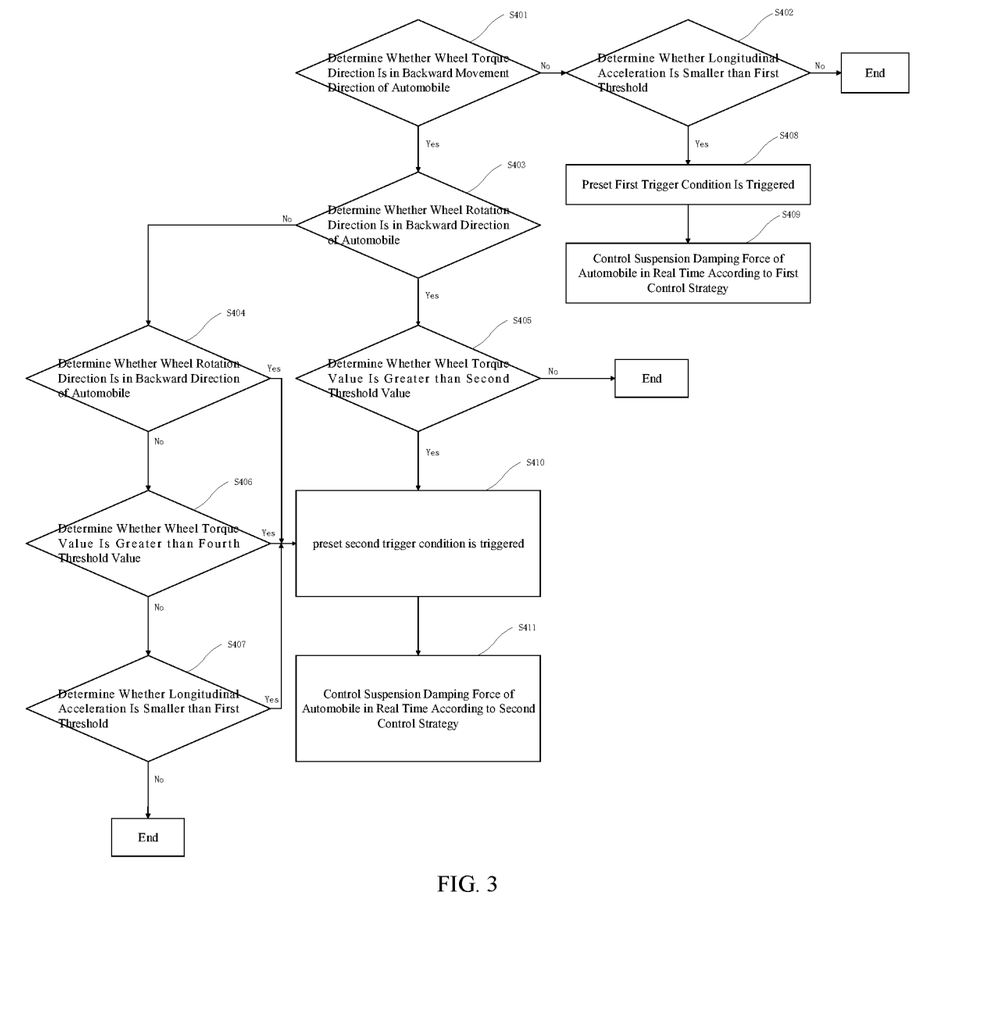
FIG. 3 is another flowchart of the anti-dive control method for an automobile according to an embodiment of the present invention.

FIG. 3 is another flowchart of the anti-dive control method for the automobile according to an embodiment of the present invention, and the application scenarios of the anti-dive control method for the automobile according to an embodiment of the present invention is described in detail as follows. As shown in FIG. 3, the anti-dive control method for the automobile includes the following steps S401 to S411.

S401: whether the wheel torque direction is in the backward direction of the automobile is determined. If yes, jump to step S403. Otherwise, jump to step S402.

S402: whether the longitudinal acceleration is smaller than the first threshold is determined. If yes, jump to step S408. Otherwise, the steps are terminated.

S408: It is determined that the preset first trigger condition is triggered, and step S409 is entered.

S409: the suspension damping force of the automobile is controlled in real time according to the first control strategy.

S403: whether the wheel rotation direction is in the backward direction of the automobile is determined. If yes, jump to step S405. Otherwise, jump to step S404.

S405: whether the wheel torque value is greater than the second threshold value is determined. If yes, jump to step S410. Otherwise, the steps are terminated.

S410: it is determined that the preset second trigger condition is triggered, and step S411 is entered.

S411: the suspension damping force of the automobile is controlled in real time according to the second control strategy.

S404: whether the pressure value of the brake master cylinder is greater than the third threshold is determined. If yes, jump to step S410. Otherwise, jump to step S406.

S406: whether the wheel torque value is greater than a fourth threshold is determined. If yes, jump to step S410. Otherwise, jump to step S407.

S407: whether the longitudinal acceleration is smaller than the first threshold is determined. If yes, jump to step S410. Otherwise, the steps are terminated.

In the anti-dive control method for the automobile proposed in this embodiment, the parameter value of the automobile operating condition parameter is obtained in real time, and whether to trigger the preset first trigger condition or the preset second trigger is determined according to the parameter value of the automobile operating condition parameter. If the preset first trigger condition is triggered, the damping force of the automobile is controlled in real time according to the first control strategy. If the second preset trigger condition is triggered, the suspension damping force of the automobile is controlled in real time according to the second control strategy. In this present application, a plurality of trigger conditions are provided and the suspension damping force of the automobile is controlled in real time according to a control strategy corresponding to each trigger condition, so that the present invention can cover more dive conditions, and also perform real-time controls on different damping forces for different dive conditions, making the anti-dive effect of the automobile better. Compared to the traditional control method, more signals including the wheel torque direction signal, the wheel rotation direction signal, the wheel torque signal, the pressure signal of the brake master cylinder, the longitudinal acceleration signal and the emergency deceleration trigger signal are utilized, thereby realizing a more accurate judgment logic, covering more comprehensive dive conditions, and improving a response speed of anti-dive control under certain conditions.

It should be understood that the sequence numbers of the steps in the above embodiments does not mean an execution sequence, and the execution sequence of each process should be determined by its function and the internal logic, which should not constitute any limitation to the implementation process of the embodiments of the present invention.

Figure 4:
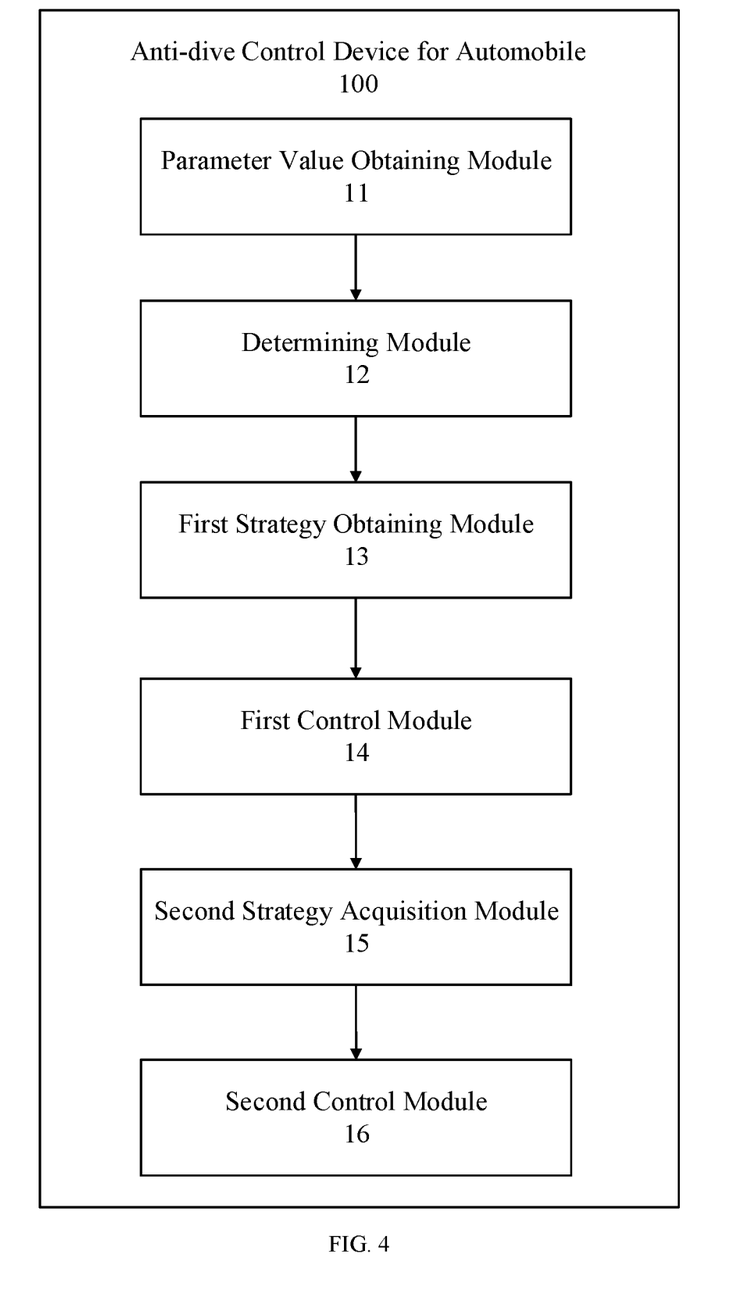
FIG. 4 illustrates a structural diagram of an anti-dive control device for the automobile according to an embodiment of the present invention.

In one embodiment, provided is an anti-dive control device for an automobile, which corresponds to the anti-dive control method for the automobile in the above-mentioned embodiment. As shown in FIG. 4, the anti-dive control device 100 for the automobile includes a parameter value obtaining module 11, a determining module 12, a first strategy obtaining module 13, a first control module 14, a second strategy obtaining module 15 and a second control module 16. Detailed description of each functional module is as follows.

The parameter value obtaining module 11 is configured to obtain a preset automobile operating condition parameter, and obtain a parameter value of the automobile operating condition parameter in real time.

The determining module 12 is configured to determine in real time whether the parameter value of the automobile operating condition parameter satisfies a preset first trigger condition or a preset second trigger condition.

The first strategy obtaining module 13 is configured to obtain a preset first control strategy corresponding to a first trigger condition, if the parameter value of the automobile operating condition parameter satisfies the preset first trigger condition.

The first control module 14 is configured to control the suspension damping force of the automobile in real time according to the first control strategy.

The second strategy acquisition module 15 is configured to obtain a preset second control strategy corresponding to a second trigger condition, if the parameter value of the automobile operating condition parameter satisfies the preset second trigger condition.

The second control module 16 is configured to control the suspension damping force of the automobile in real time according to the second control strategy.

In one embodiment, the first control module 14 further includes:
a first parameter obtaining unit, configured to obtain a preset first set of operating condition parameters corresponding to the first trigger condition, and obtain each parameter value of the first set of operating condition parameters in real time;
a first parameter value querying unit, configured to query damping forces mapped to the each parameter values of the first set of operating condition parameters, and take the largest damping force from the queried damping forces as a first damping force;
an emergency deceleration operating condition obtaining unit, configured to obtain each emergency deceleration operating condition triggered by the emergency deceleration trigger signal;
a damping force querying unit, configured to query the damping forces mapped to each triggered emergency deceleration operating condition, and take the largest damping force from the queried damping forces as the second damping force; and
a first control unit, configured to take a larger one of the first damping force and the second damping force as a target damping force control amount, and control the suspension damping force of the automobile in real time according to the target damping force control amount.

In one embodiment, the first parameter obtaining unit is specifically configured to obtain a pressure value of a brake master cylinder and a longitudinal acceleration of the automobile in real time.

In one embodiment, the first parameter value querying unit is specifically configured to:
query a damping force mapped to the pressure value of the brake master cylinder; and
query a damping force mapped to the longitudinal acceleration of the automobile.

In one embodiment, the second control module 16 further includes:
a second parameter obtaining unit, configured to obtain a preset second set of operating condition parameters corresponding to the second trigger condition, and obtain the each parameter value of the second set of operating condition parameters in real time;
a second parameter value querying unit, configured to query damping forces mapped to the each parameter value of the second set of operating condition parameters, and take the largest damping force from the queried damping forces as a third damping force;
an emergency deceleration operating condition obtaining unit, configured to obtain each emergency deceleration operating condition triggered by the emergency deceleration trigger signal;
a damping force querying unit, configured to query damping forces mapped to each triggered emergency deceleration operating condition, and take the largest damping force from the queried damping forces as a second damping force; and
a second control unit, configured to take a larger one of the third damping force and the second damping force as a target damping force control amount, and control a suspension damping force of the automobile in real time according to the target damping force control amount.

In one embodiments, the second parameter value querying unit is specifically configured to:
obtain the pressure value of the brake master cylinder, the wheel torque value and the longitudinal acceleration of the automobile in real time.

In one embodiment, the second parameter value querying unit is specifically configured to:
query a damping force mapped to the pressure value of the brake master cylinder;
query a damping force mapped to the wheel torque value; and
query a damping force mapped to the longitudinal acceleration of the automobile.

In one embodiment, the preset automobile operating condition parameter include the wheel torque direction and the longitudinal acceleration, and the determining module 12 specifically includes:
a first determining unit, configured to determine whether the wheel torque direction is in a backward direction of the automobile; if not, determine whether the longitudinal acceleration is smaller than a preset first threshold; if yes, determine whether a parameter value of the automobile condition parameter satisfies the preset first trigger condition.

In one embodiment, the preset automobile operating condition parameter include the wheel torque direction, the wheel rotation direction, the wheel torque value, the pressure value of the brake master cylinder and the longitudinal acceleration. The determining module 12 specifically includes:
a second determining unit, configured to determine whether the wheel torque direction is in the backward direction of the automobile; if yes, determine whether the wheel rotation direction is in the backward direction of the automobile;
a third determining unit, configured to determine whether the wheel torque value is greater than a preset second threshold, if the wheel rotation direction is in the backward direction of the automobile; if yes, it is determined that the parameter value of the vehicle operating condition parameter satisfies the preset second trigger condition; and
a fourth determining unit, configured to determine whether the pressure value of the brake master cylinder is greater than a preset third threshold, if the wheel rotation direction is not in the backward direction of the automobile; if yes, it is determined that the parameter value of the automobile condition parameter satisfies the preset second trigger condition; otherwise, determine whether the wheel torque value is greater than a preset fourth threshold value; if yes, it is determined that the parameter value of the automobile operating condition parameter satisfies the preset second trigger condition; otherwise, determined whether the longitudinal acceleration is smaller than the preset first threshold value; if yes, it is determined that the parameter value of the automobile operating condition parameter satisfies the preset second trigger condition.

The present application provides an anti-dive control method for an automobile, a device, an electronic suspension controller and a storage medium, in which a parameter value of an automobile operating condition parameters is obtained in real time, and whether to trigger a preset first trigger condition or a preset second trigger condition is determined according to the parameter value of the automobile operating condition parameter. If the preset first trigger condition is triggered, a suspension damping force of the automobile is controlled in real time according to a first control strategy. If the preset second trigger condition is triggered, the suspension damping force of the automobile is controlled in real time according to a second control strategy. In the present application, a plurality of trigger conditions are provided and the suspension damping force of the automobile is controlled in real time according to a control strategy corresponding to each trigger condition, so that the present invention can cover more dive conditions, and also perform a real-time control on different damping forces for different dive conditions, making the anti-dive effect of the automobile better.

The meanings of "first" and "second" in the above modules/units are only to distinguish different modules/units, and are not used to define which module/unit has a higher priority or other limiting meanings. Furthermore, the terms "including" and "having", and any variations thereof, are intended to cover non-exclusive inclusion. For example, a process, method, system, product or device comprising a series of steps or modules is not necessarily limited to those steps or modules explicitly listed, but may include other steps or modules not explicitly listed or inherent to the process, method, product or device. A division of modules in this application is only a logical division, and there may be other divisions in practical applications.

Specific limitations of the anti-dive control device for the automobile may refer to limitations of the above-mentioned anti-dive control method for the automobiles, which will not be repeated herein. All or part of the modules in the anti-dive control device for the automobile may be implemented by a software, a hardware or a combination thereof. The above modules may be embedded in or independent of a processor in an electronic suspension controller in a form of hardware, and may also be stored in a memory of the electronic suspension controller in a form of software, so that the processor can call and execute the corresponding modules of the above-mentioned modules.

Figure 5:
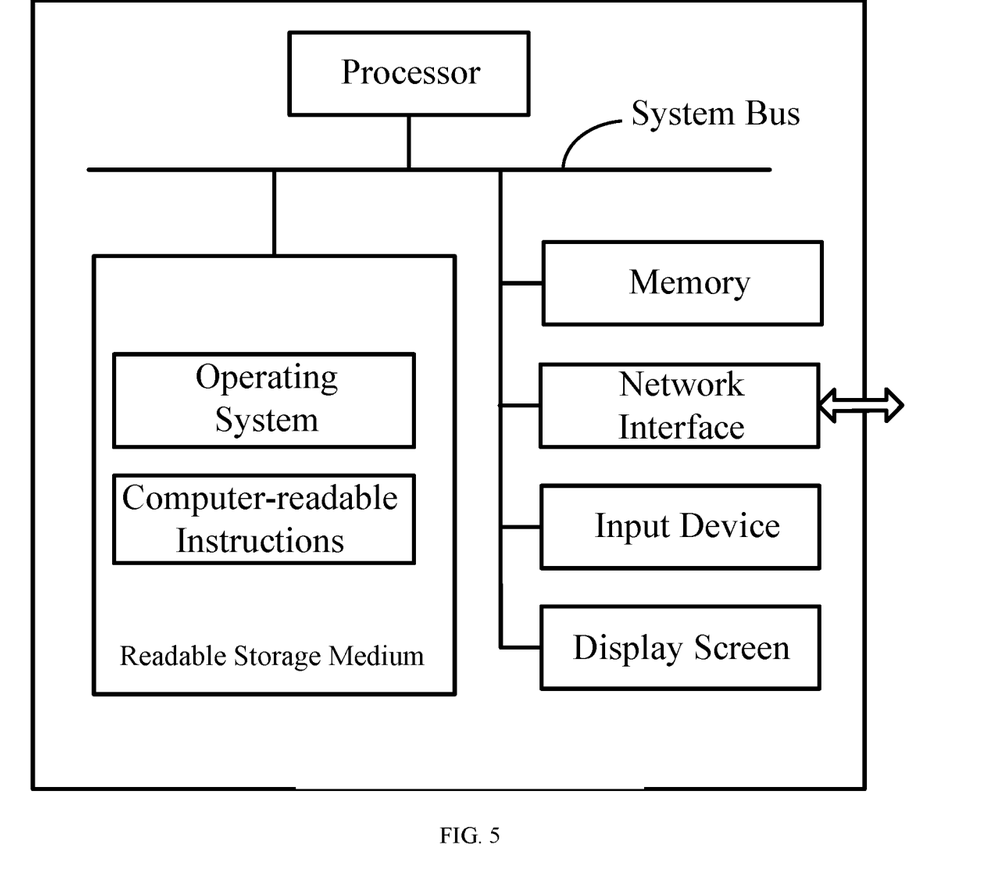
FIG. 5 illustrates a diagram of an electronic suspension controller according to an embodiment of the present invention.

In one embodiment, provided is an electronic suspension controller, an internal structure diagram of which may be as shown in FIG. 5. The electronic suspension controller includes a processor, a memory, a network interface, a display screen and an input device, and they are connected through a Controller Area Network (CAN) bus. The processor of the electronic suspension controller is configured to provide a computing and control capability. The memory of the electronic suspension controller includes a readable storage medium and an internal memory. The readable storage medium stores an operating system and computer-readable instructions. The memory provides an environment for executing the operating system and computer-readable instructions in the readable storage medium. The network interface of the electronic suspension controller is configured to communicate with external devices through a network connection. When the computer-readable instructions are executed by the processor, the anti-dive control method for the automobile is implemented. The readable storage medium includes a non-volatile storage medium and a volatile storage medium.

In one embodiment, provided is an electronic suspension controller, including a memory, a processor, and computer-readable instructions stored in the memory and running on the processor. When one or more the processors execute the computer-readable instructions, the steps of the anti-dive control method for the automobile are implemented by one or more the processors, such as steps 101 to 106 shown in FIG. 2 and other extensions of the method and extensions of related steps. Alternatively, when the processor executes the computer-readable instructions, the functions of each module/unit of the anti-dive control device for the automobile in the above-mentioned embodiment are realized, such as the functions of modules 11 to 16 shown in FIG. 4, which are not repeated herein to avoid repetition.

The processor may be a Central Processing Unit (CPU), other general-purpose processor, a Digital Signal Processor (DSP), an Application Specific Integrated Circuit (ASIC), a Field-Programmable Gate Array (FPGA) or other programmable logic devices, a discrete gate, a transistor logic devices, a discrete hardware component, and the like. The general-purpose processor may be a microprocessor or any conventional processor. The processor is a control center of the computer device, which is connected to all parts of the computer device through various interfaces and lines.

The memory may be configured to store the computer-readable instructions and/or module, and the processor implements various functions of the computer device by running or executing computer-readable instructions and/or modules stored in the memory and calling data stored in the memory. The memory may mainly include a program storing area and a data storing area. The program storing area may store an operating system, an application program required for at least one function (such as a sound playback function and an image playback function). The data storing area may store data created by a mobile phone (such as audio data and video data).

The memory may be integrated in the processor, or may be arranged separately from the processor.

In one embodiment, provided is one or more readable storage medium, on which computer-readable instructions are stored. The readable storage medium provided by this embodiment includes a non-volatile storage medium and a volatile storage medium. The computer-readable instructions are stored on the readable storage medium, when the computer-readable instructions are executed by one or more processors, the steps of the anti-dive control method for the automobile in the above-mentioned embodiments are implemented by one or more processors, such as steps 101 to 106 shown in FIG. 2 and other extensions of the method and extensions of related steps. Alternatively, when the computer-readable instructions are executed by the processor, the functions of each module/unit of the anti-dive control device for the automobile in the above-mentioned embodiment are realized, such as the functions of modules 11 to 16 shown in FIG. 4, which are not repeated herein to avoid repetition.

Those of ordinary skill in the art can understand that all or part of the processes in the method of the above embodiments may be implemented by instructing a relevant hardware through computer-readable instructions, and the computer-readable instructions may be stored in a non-volatile or volatile computer-readable storage medium. When the computer-readable instructions are executed, it may processes the method of the above-mentioned embodiments. Any reference to memory, storage, database or other medium used in the various embodiments provided in this application may include a non-volatile memory and/or a volatile memory. The non-volatile memory may include read only memory (ROM), programmable ROM (PROM), electrically programmable ROM (EPROM), electrically erasable programmable ROM (EEPROM), or flash memory. The volatile memory may include random access memory (RAM) or external cache memory. As an illustration and not limitation, RAM is available in various forms such as static RAM (SRAM), dynamic RAM (DRAM), synchronous DRAM (SDRAM), double data rate SDRAM (DDRSDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

In the anti-dive control method for the automobile, the device, the electronic suspension controller, and the storage medium proposed in this embodiment, the wheel torque direction signal, the wheel rotation direction signal, the wheel torque signal, the pressure signal of the brake master cylinder, the longitudinal acceleration signal and the emergency deceleration trigger signal are utilized, thereby realizing a more comprehensive logical determination and covering more comprehensive control conditions. The control conditions can cover some automobile dive conditions that cannot be covered by the traditional control methods that only refer to the pressure signal of the brake master cylinder, such as: an automobile dive caused by an energy recovery of the drive motor, an automobile dive caused by an actuation of other components with pressure establishment capability in a braking system, an automobile dive caused by an acceleration of the automobile in the backward direction, an automobile dive caused by a braking by a mechanical handbrake or an electronic handbrake, a false trigger caused by the automobile going up and down a slope, and a false triggering caused by the automobile passing through obstacles such as steps that easily cause the longitudinal acceleration signal of the automobile to oscillate. Under these emergency deceleration conditions, this embodiment uses the emergency deceleration trigger signal to directly trigger the anti-dive function, thereby achieving a more timely control response, and avoiding a part of the control leakage, such as: a braking of mechanical hand brake, a braking of electronic hand brake, a braking caused by the actuation of other components in the braking system with the ability to build pressure, making the anti-dive effect of the automobile better.

Those skilled in the art can clearly understand that, for the convenience and simplicity of description, the division of the above-mentioned functional units and modules is only used as an example. In practical applications, the above-mentioned function allocation may be completed by different functional units and modules as required, that is, an internal structure of the device is divided into different functional units or modules to complete all or part of the above-mentioned functions.

The above-mentioned embodiments are only used to illustrate the technical solutions of the present invention, but not to limit them. Although the present invention has been described in detail with reference to the above-mentioned embodiments, those of ordinary skill in the art should understand that: it is still possible to modify the technical solutions recorded in the above-mentioned embodiments, or perform equivalent replacements to some of the technical features. These modifications or replacements do not make the essence of the corresponding technical solutions deviate from the spirit and scope of the technical solutions of the embodiments of the present invention, and should be included within the protection scope of the present invention.

What is claimed is:

1. An anti-dive control method for an automobile, comprising:

obtaining a parameter value of a preset automobile operating condition parameter in real time;

determining in real time whether the parameter value of the automobile operating condition parameter satisfies a preset first trigger condition or a preset second trigger condition;

obtaining a preset first control strategy corresponding to the first trigger condition, in response to that the parameter value of the automobile operating condition parameter satisfies the preset first trigger condition;

controlling a suspension damping force of the automobile in real time according to the first control strategy;

obtaining a preset second control strategy corresponding to the second trigger condition, in response to that the parameter value of the automobile operating condition parameter satisfies the preset second trigger condition; and controlling the suspension damping force of the automobile in real time according to the second control strategy;

wherein controlling the suspension damping force of the automobile in real time according to the first control strategy comprises:

obtaining a preset first set of operating condition parameters corresponding to the first trigger condition, and obtaining each parameter value of the first set of operating condition parameters in real time;

querying damping forces mapped to the each parameter value of the first set of operating condition parameters, and taking a largest damping force from the queried damping forces as a first damping force;

obtaining each emergency deceleration operation condition triggered by each emergency deceleration trigger signal;

querying damping forces mapped to each triggered emergency deceleration operating condition, and taking a largest damping force from the queried damping forces as a second damping force; and taking a larger one of the first damping force and the second damping force as a target damping force control amount, and controlling the suspension damping force of the automobile in real time according to the target damping force control amount.

2. The anti-dive control method for the automobile of claim 1, wherein obtaining the preset first set of operating condition parameters corresponding to the first trigger condition, and obtaining the each parameter value of the first set of operating condition parameters in real time comprises:
   obtaining a pressure value of a brake master cylinder and a longitudinal acceleration of the automobile in real time;
   wherein querying damping forces mapped to the each parameter value of in the first set of operating condition parameters comprises:
   querying a damping force mapped to the pressure value of the brake master cylinder; and
   querying a damping force mapped to the longitudinal acceleration of the automobile.

3. The anti-dive control method for the automobile of claim 1, wherein controlling the suspension damping force of the automobile in real time according to the second control strategy comprises:
   obtaining a preset second set of operating condition parameters corresponding to the second trigger condition, and obtaining each parameter value of the second set of operating condition parameters in real time;
   querying damping forces mapped to the each parameter value of the second set of operating condition parameter, and taking a largest damping force from the queried damping forces as a third damping force;
   obtaining each emergency deceleration operating condition triggered by the emergency deceleration trigger signal;
   querying damping forces mapped to each triggered emergency deceleration operating condition, and taking a largest damping force from the queried damping forces as a second damping force; and
   taking a larger one of the third damping force and the second damping force as a target damping force control amount, and controlling the suspension damping force of the automobile in real time according to the target damping force control amount.

4. The anti-dive control method for the automobile of claim 3, wherein obtaining the preset second set of operating condition parameters corresponding to the second trigger condition, and obtaining the each parameter value of the second set of operating condition parameters in real time comprises:
   obtaining a pressure value of a brake master cylinder, a wheel torque value and a longitudinal acceleration of the automobile in real time;
   wherein querying the damping forces mapped to the each parameter value of the second set of operating condition parameters comprises:
   querying a damping force mapped to the pressure value of the brake master cylinder;
   querying a damping force mapped to the wheel torque value; and
   querying a damping force mapped to the longitudinal acceleration of the automobile.

5. The anti-dive control method for the automobile of claim 1, wherein the preset automobile operating condition parameter comprises a wheel torque direction and a longitudinal acceleration, and determining in real time whether the parameter value of the automobile operating condition parameter satisfies the preset first trigger condition comprises:
   determining whether the wheel torque direction is in a backward direction of the automobile; in response to that the wheel torque direction is not in the backward direction of the automobile, determining whether the longitudinal acceleration is smaller than a preset first threshold; in response to that the wheel torque direction is in the backward direction of the automobile, determining that the parameter value of the automobile operating condition parameter satisfies the preset first trigger condition.

6. The anti-dive control method for the automobile of claim 1, wherein the preset automobile operating condition parameter comprises a wheel torque direction, a wheel rotation direction, a wheel torque value, a pressure value of a brake master cylinder and a longitudinal acceleration, and determining in real time whether the parameter value of the automobile operating condition parameter satisfies the preset second trigger condition comprises:
   determining whether the wheel torque direction is in a backward direction of the automobile; in response to that the wheel torque direction is in the backward direction of the automobile, determining whether the wheel rotation direction is in the backward direction of the automobile;
   determining whether the wheel torque value is greater than the preset second threshold value, if the wheel rotation direction is in the backward the direction of the automobile; in response to that the wheel torque value is greater than the preset second threshold value, determining that the parameter value of the automobile operating condition parameter satisfies the preset second trigger condition;
   determining whether the pressure value of the brake master cylinder is greater than the preset third threshold value, if the wheel rotation direction is not in the backward direction of the automobile; in response to that the pressure value of the brake master cylinder is greater than the preset third threshold value, determining that the parameter value of the automobile operating condition parameter satisfies the preset second trigger condition; otherwise, determining whether the wheel torque value is greater than a preset fourth threshold; in response to that the wheel torque value is greater than the preset fourth threshold, determining that the parameter value of the automobile operating condition parameter satisfies the preset second trigger condition; otherwise, determining whether the longitudinal acceleration is smaller than a preset first threshold; in response to that the longitudinal acceleration is smaller than the preset first threshold, determining that the parameter value of the automobile operating condition parameter satisfies the preset second trigger condition.

7. An electronic suspension controller, comprising:
   a memory;
   a processor; and
   computer-readable instructions stored in the memory and executable by the processor;
   when the processor executes the computer-readable instructions, the following steps are performed:
   obtaining a parameter value of a preset automobile operating condition parameter in real time;
   determining in real time whether the parameter value of the automobile operating condition parameter satisfies a preset first trigger condition or a preset second trigger condition;
   obtaining a preset first control strategy corresponding to the first trigger condition, in response to that the parameter value of the automobile operating condition parameter satisfies the preset first trigger condition;
   controlling a suspension damping force of the automobile in real time according to the first control strategy;

obtaining a preset second control strategy corresponding to the second trigger condition, in response to that the parameter value of the automobile operating condition parameter satisfies the preset second trigger condition; and controlling the suspension damping force of the automobile in real time according to the second control strategy;

wherein controlling the suspension damping force of the automobile in real time according to the first control strategy comprises:

obtaining a preset first set of operating condition parameters corresponding to the first trigger condition, and obtaining each parameter value of the first set of operating condition parameters in real time;

querying damping forces mapped to the each parameter value of the first set of operating condition parameters, and taking a largest damping force from the queried damping forces as a first damping force;

obtaining each emergency deceleration operation condition triggered by each emergency deceleration trigger signal;

querying damping forces mapped to each triggered emergency deceleration operating condition, and taking a largest damping force from the queried damping forces as a second damping force; and taking a larger one of the first damping force and the second damping force as a target damping force control amount, and controlling the suspension damping force of the automobile in real time according to the target damping force control amount.

8. The electronic suspension controller of claim 7, wherein obtaining the preset first set of operating condition parameters corresponding to the first trigger condition, and obtaining the each parameter value of the first set of operating condition parameters in real time comprises:

obtaining a pressure value of a brake master cylinder and a longitudinal acceleration of the automobile in real time;

wherein querying damping forces mapped to the each parameter value of in the first set of operating condition parameters comprises:

querying a damping force mapped to the pressure value of the brake master cylinder; and querying a damping force mapped to the longitudinal acceleration of the automobile.

9. The electronic suspension controller of claim 7, wherein controlling the suspension damping force of the automobile in real time according to the second control strategy comprises:

obtaining a preset second set of operating condition parameters corresponding to the second trigger condition, and obtaining each parameter value of the second set of operating condition parameters in real time;

querying damping forces mapped to the each parameter value of the second set of operating condition parameter, and taking a largest damping force from the queried damping forces as a third damping force;

obtaining each emergency deceleration operating condition triggered by the emergency deceleration trigger signal;

querying damping forces mapped to each triggered emergency deceleration operating condition, and taking a largest damping force from the queried damping forces as a second damping force; and taking a larger one of the third damping force and the second damping force as a target damping force control amount, and controlling the suspension damping force of the automobile in real time according to the target damping force control amount.

10. The electronic suspension controller of claim 9, wherein obtaining the preset second set of operating condition parameters corresponding to the second trigger condition, and obtaining the each parameter value of the second set of operating condition parameters in real time comprises:

obtaining a pressure value of a brake master cylinder, a wheel torque value and a longitudinal acceleration of the automobile in real time;

wherein querying the damping forces mapped to the each parameter value of the second set of operating condition parameters comprises:

querying a damping force mapped to the pressure value of the brake master cylinder;

querying a damping force mapped to the wheel torque value; and querying a damping force mapped to the longitudinal acceleration of the automobile.

11. The electronic suspension controller of claim 7, wherein the preset automobile operating condition parameter comprises a wheel torque direction and a longitudinal acceleration, and determining in real time whether the parameter value of the automobile operating condition parameter satisfies the preset first trigger condition comprises:

determining whether the wheel torque direction is in a backward direction of the automobile; in response to that the wheel torque direction is not in the backward direction of the automobile, determining whether the longitudinal acceleration is smaller than a preset first threshold; in response to that the wheel torque direction is in the backward direction of the automobile, determining that the parameter value of the automobile operating condition parameter satisfies the preset first trigger condition.

12. The electronic suspension controller of claim 7, wherein the preset automobile operating condition parameter comprises a wheel torque direction, a wheel rotation direction, a wheel torque value, a pressure value of a brake master cylinder and a longitudinal acceleration, and determining in real time whether the parameter value of the automobile operating condition parameter satisfies the preset second trigger condition comprises:

determining whether the wheel torque direction is in a backward direction of the automobile; in response to that the wheel torque direction is in the backward direction of the automobile, determining whether the wheel rotation direction is in the backward direction of the automobile;

determining whether the wheel torque value is greater than the preset second threshold value, if the wheel rotation direction is in the backward the direction of the automobile; in response to that the wheel torque value is greater than the preset second threshold value, determining that the parameter value of the automobile operating condition parameter satisfies the preset second trigger condition;

determining whether the pressure value of the brake master cylinder is greater than the preset third threshold value, if the wheel rotation direction is not in the backward direction of the automobile; in response to that the pressure value of the brake master cylinder is greater than the preset third threshold value, determining that the parameter value of the automobile operating condition parameter satisfies the preset second trigger condition; otherwise, determining whether the wheel torque value is greater than a preset fourth threshold; in response to that the wheel torque value is greater than the preset fourth threshold, determining that the parameter value of the automobile operating condition parameter satisfies the preset second trigger condition; otherwise, determining whether the longitudinal acceleration is smaller than a preset first threshold; in response to that the longitudinal acceleration is smaller than the preset first threshold, determining that the parameter value of the automobile operating condition parameter satisfies the preset second trigger condition.

13. A non-volatile readable storage medium having stored therein computer-readable instructions, wherein when the computer-readable instructions are executed by one or more processors, following steps are performed by the one or more processors:

obtaining a parameter value of a preset automobile operating condition parameter in real time;

determining in real time whether the parameter value of the automobile operating condition parameter satisfies a preset first trigger condition or a preset second trigger condition;

obtaining a preset first control strategy corresponding to the first trigger condition, in response to that the parameter value of the automobile operating condition parameter satisfies the preset first trigger condition;

controlling a suspension damping force of the automobile in real time according to the first control strategy;

obtaining a preset second control strategy corresponding to the second trigger condition, in response to that the parameter value of the automobile operating condition parameter satisfies the preset second trigger condition; and controlling the suspension damping force of the automobile in real time according to the second control strategy;

wherein controlling the suspension damping force of the automobile in real time according to the first control strategy comprises:

obtaining a preset first set of operating condition parameters corresponding to the first trigger condition, and obtaining each parameter value of the first set of operating condition parameters in real time;

querying damping forces mapped to the each parameter value of the first set of operating condition parameters, and taking a largest damping force from the queried damping forces as a first damping force;

obtaining each emergency deceleration operation condition triggered by each emergency deceleration trigger signal;

querying damping forces mapped to each triggered emergency deceleration operating condition, and taking a largest damping force from the queried damping forces as a second damping force; and taking a larger one of the first damping force and the second damping force as a target damping force control amount, and controlling the suspension damping force of the automobile in real time according to the target damping force control amount.

14. The non-volatile readable storage medium of claim 13, wherein obtaining the preset first set of operating condition parameters corresponding to the first trigger condition, and obtaining the each parameter value of the first set of operating condition parameters in real time comprises:

obtaining a pressure value of a brake master cylinder and a longitudinal acceleration of the automobile in real time;

wherein querying damping forces mapped to the each parameter value of in the first set of operating condition parameters comprises:

querying a damping force mapped to the pressure value of the brake master cylinder; and querying a damping force mapped to the longitudinal acceleration of the automobile.

15. The non-volatile readable storage medium of claim 13, wherein controlling the suspension damping force of the automobile in real time according to the second control strategy comprises:

obtaining a preset second set of operating condition parameters corresponding to the second trigger condition, and obtaining each parameter value of the second set of operating condition parameters in real time;

querying damping forces mapped to the each parameter value of the second set of operating condition parameter, and taking a largest damping force from the queried damping forces as a third damping force;

obtaining each emergency deceleration operating condition triggered by the emergency deceleration trigger signal;

querying damping forces mapped to each triggered emergency deceleration operating condition, and taking a largest damping force from the queried damping forces as a second damping force; and taking a larger one of the third damping force and the second damping force as a target damping force control amount, and controlling the suspension damping force of the automobile in real time according to the target damping force control amount.

16. The non-volatile readable storage medium of claim 13, wherein the preset automobile operating condition parameter comprises a wheel torque direction, a wheel rotation direction, a wheel torque value, a pressure value of a brake master cylinder and a longitudinal acceleration, and determining in real time whether the parameter value of the automobile operating condition parameter satisfies the preset second trigger condition comprises:

determining whether the wheel torque direction is in a backward direction of the automobile; in response to that the wheel torque direction is in the backward direction of the automobile, determining whether the wheel rotation direction is in the backward direction of the automobile;

determining whether the wheel torque value is greater than the preset second threshold value, if the wheel rotation direction is in the backward the direction of the automobile; in response to that the wheel torque value is greater than the preset second threshold value, determining that the parameter value of the automobile operating condition parameter satisfies the preset second trigger condition;

determining whether the pressure value of the brake master cylinder is greater than the preset third threshold value, if the wheel rotation direction is not in the backward direction of the automobile; in response to that the pressure value of the brake master cylinder is greater than the preset third threshold value, determining that the parameter value of the automobile operating condition parameter satisfies the preset second trigger condition; otherwise, determining whether the wheel torque value is greater than a preset fourth threshold; in response to that the wheel torque value is greater than the preset fourth threshold, determining that the parameter value of the automobile operating condition parameter satisfies the preset second trigger condition; otherwise, determining whether the longitudinal acceleration is smaller than a preset first threshold; in response to that the longitudinal acceleration is smaller than the preset first threshold, determining that the parameter value of the automobile operating condition parameter satisfies the preset second trigger condition.

17. The non-volatile readable storage medium of claim 13, wherein the preset automobile operating condition parameter comprises a wheel torque direction and a longitudinal acceleration, and determining in real time whether the parameter value of the automobile operating condition parameter satisfies the preset first trigger condition comprises:

determining whether the wheel torque direction is in a backward direction of the automobile; in response to that the wheel torque direction is not in the backward direction of the automobile, determining whether the longitudinal acceleration is smaller than a preset first threshold; in response to that the wheel torque direction is in the backward direction of the automobile, determining that the parameter value of the automobile operating condition parameter satisfies the preset first trigger condition.

* * * * *